United States Patent Office 2,736,843
Patented Feb. 28, 1956

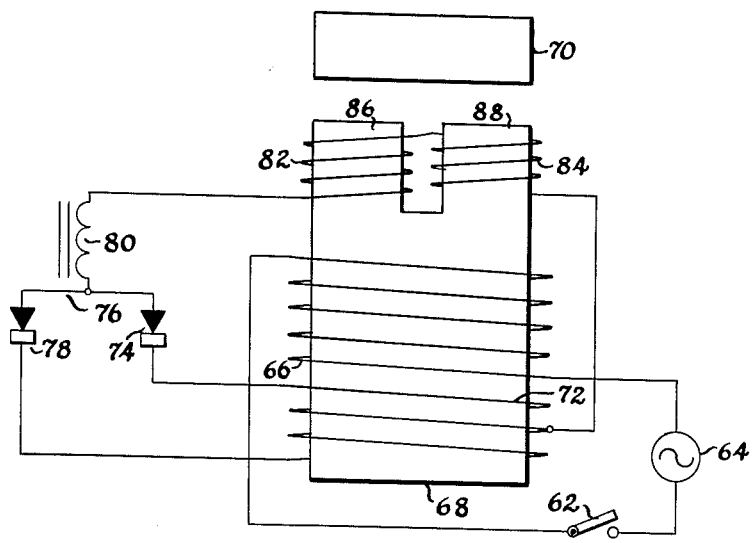

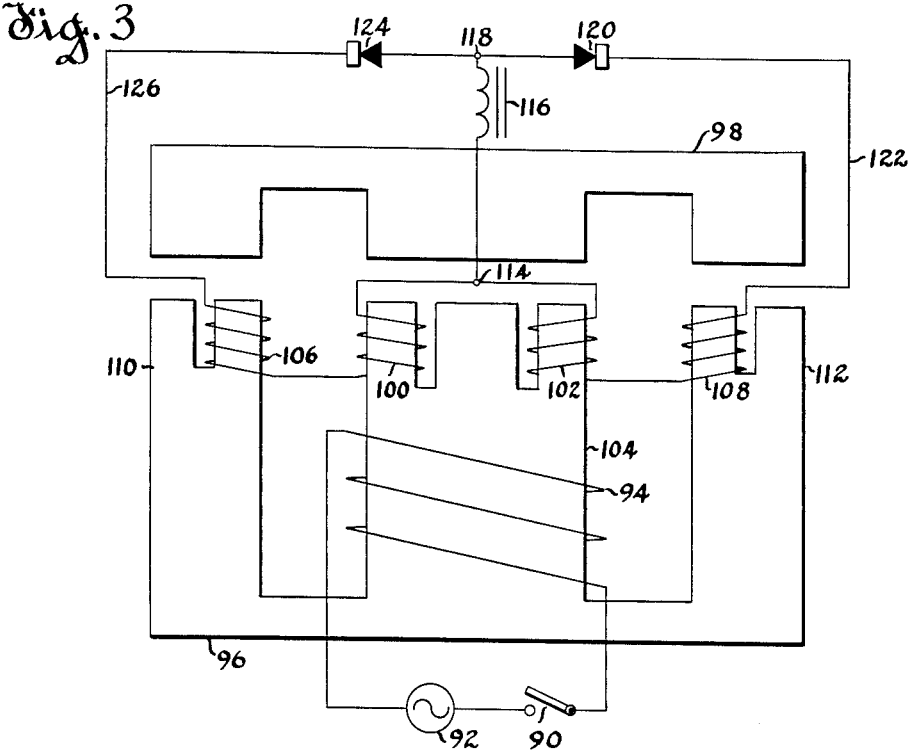
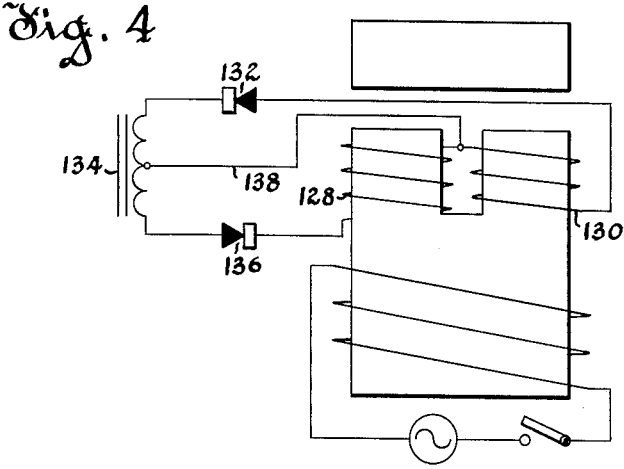

2,736,843

ALTERNATING CURRENT ELECTROMAGNETS

John F. H. Douglas and Arthur F. Kolb, Milwaukee, Wis., assignors to Cutler-Hammer, Inc., Milwaukee, Wis., a corporation of Delaware Application July 25, 1952, Serial No. 300,862

6 Claims. (Cl. 317—156)

This invention relates to alternating current electromagnets, and more particularly to means for eliminating chattering and reducing hum therein.

The use of pole shaders, or pole shading windings excited by direct current in connection with alternating current electromagnets for eliminating chattering or hum is well known. However, such usual expedients have not been entirely successful when applied to certain types of alternating current electromagnets, one such type being a short stroke magnet in which the open gap pull is nearly as great as the sealed pull. The usual methods of direct current excitation of pole shading windings heretofore employed have been attended by relatively high power consumption and generation of heat.

It is a primary object of the present invention to provide for alternating current electromagnets, improved systems of pole shading windings and excitation therefor which eliminate chattering and reduce hum.

Another object is to provide systems of the aforementioned type which are characterized by low power consumption and low heat generation; and A further object is to provide systems of the aforementioned type which are relatively simple and economical to manufacture.

Other objects and advantages of the invention will hereinafter appear.

The accompanying drawings illustrate preferred embodiments of the invention which will now be described, it being understood that the embodiments illustrated are susceptible of various modifications in respect of details without departing from the scope of the appended claims.

In the drawings,

Figure 1 is a schematic showing of the invention as applied to an E-shaped electromagnet;

Fig. 2 is a schematic showing of the invention as applied to a single pole electromagnet;

Fig. 3 is a schematic showing of an alternative form of the invention as applied to an E-shaped magnet; and Fig. 4 is a schematic showing of an alternative form of the invention as applied to a single pole electromagnet.

Referring to Fig. 1 of the drawing, upon closure of a switch 10 alternating current flows from a source 12 through conductors 14 and 15 to energize the main magnet winding 16 wound on the center leg 18 of the E-shaped magnet, indicated generally at 20, causing magnetic flux flow in the center leg 18, outer leg 22, outer leg 24 and an armature 26. The magnetic force resultant of such flux causes the armature 26, shown in unattracted position in Fig. 1 with switch 10 open, to move and magnetically seal upon the magnet 20 at seal faces 28, 29, 30, 31, 32 and 33.

Energization of the main winding 16 by closure of the switch 10 results as well, by transformer action, in the induction of an alternating voltage in a secondary winding 34 which is placed in inductive relation to the main winding 16. The alternating voltage thus induced in winding 34 causes alternating current to flow in conductors 36 and 37 to a full wave bridge rectifier 40, comprising four dry type rectifiers, at the rectifier input terminals 46 and 48 thus making said terminals of alternate positive and negative polarity. The bridge rectifier, by action well known in the art, connects input terminals 46 and 48 to output terminals 50 and 52 alternately thereby maintaining output terminal 50 at positive potential with respect to terminal 52. Rectified current will be caused to flow by this potential difference through the series electrical connection of a filter choke 54 and pole shading windings or coils 60, 58 and 56, in that order, and thence to terminal 50 of the rectifier.

Pole shading windings 56 and 60 are wound about similar cross-sectional areas of legs 24 and 22, in which they are preferably embedded in slots or recesses formed in such legs respectively, whereas shading winding 58, which is preferably embedded in a slot or recess formed in the center leg 18, is wound about a cross-sectional area of leg 18 equal to the sum of the areas of the legs 22 and 24 about which windings 56 and 60 are respectively wound. The flow of rectified and filtered current through each of these coils creates a substantially constant shading flux and holding force at its associated seal face.

The polarity of the alternating magnetic flux caused by energizing main winding 16 is, at any instant, the same in the outer legs 22 and 24, but is opposite to that of the outer legs in center leg 18. Thus the alternating voltages induced in outer leg shading coils 56 and 60 are opposite in phase to that induced in shading winding 58. Moreover, since the number of turns and winding direction of each shading coil is like that of each of the others and the center leg shading coil 58 is wound about twice as much pole cross-sectional area as either of the other shading windings, the sum of the magnitudes of alternating voltage induced in the outer leg shading windings equals that of, and is in opposite phase to, the alternating voltage induced in the center leg shading winding. Electrical connection of the shading windings is made in series to thereby cause such alternating induced voltages to effectively cancel. With zero net effective induced alternating voltage, no alternating circulating current flows in the shading winding excitation circuit and thus power losses and heating are minimized.

Many variations are possible, and application of this invention is not limited to the particular magnet structures or electrical connections shown. Separate excitation means, other than the one shown, may be used. Secondary winding 34 may be center-tapped to allow use of other full wave rectifying means. The pole shading windings may be inserted in the armature rather than in magnet faces. Nor is it essential that the number of turns and pole cross-sectional areas about which the several shading windings are wound be related to one another as shown in Fig. 1, the only requirement being that they be so related that the shading windings together with the rectifiers produce balanced unidirectional shading flux while the flow of circulating alternating currents is prevented.

To further illustrate these statements, a second embodiment of the invention is shown in Fig. 2. The magnet is shown unenergized. Upon closure of the switching means 62, alternating current is permitted to flow from a source 64 through main winding 66, whereupon pole 68 becomes magnetized. The associated armature 70 is attracted, against its load (not shown), to the pole 68. A center-tapped secondary winding 72 wound upon the pole 68 and inductively coupled to main winding 66 has an alternating voltage induced therein by transformer action. This alternating voltage is applied across the series combination of half wave rectifier 74, conductor 76 and half wave rectifier 78. Between conductor 76 and the center tap of secondary winding 72 is connected the series combination of a filter choke 80, a shading pole winding 82 and a shading pole winding 84. Rectifiers 74 and 78 have connection with secondary winding 72 to supply full wave rectified current to the shading pole windings 82 and 84 after filtering by filter choke 80.

Shading pole windings 82 and 84 are wound upon shading poles 86 and 88 respectively in inductive relation with main winding 66. Upon energization of winding 66 and the establishment of alternating magnetic flux in the magnet and its shading poles, an alternating voltage is induced in each of the shading windings. These voltages, however, are opposite in phase because the shading windings 82 and 84 have opposed winding directions.

By constructing the shading windings with an equal numbers of turns an enclosing equal amounts of alternating main winding flux, or such other combination of turns and amount of flux as will cause the magnitudes of alternating voltage induced in the separate shading windings to be equal, the total induced alternating voltage is made zero and no undesirable alternating current will circulate through the shading coils, thus power consumption and heating are minimized. Such construction also insures that the shading flux developed will be unidirectional and balanced during both half cycles of the supply voltage alternations.

Again the magnet shape and circuit configuration is representative only, other variations being possible. Other arrangements for excitation of the shading pole windings are similarly possible. For example, excitation could be had using a transformer separate from the main magnet winding, from the main magnet winding connected as an autotransformer or from a separate direct current source. Moreover, excitation for the shading pole windings may be had by utilizing the voltage induced in the shading pole windings by the alternating flux produced in the magnet structure as an incident to energization of the main energizing winding. Each of Figures 3 and 4 of the drawing illustrates a way in which this may be done.

Referring to Fig. 3, upon closure of switch 90, alternating current flows from source 92 through main magnet energizing winding 94 thus magnetizing the magnet structure which comprises a relatively movable E-shaped pole piece 96 and armature 98. Magnetizing the magnetic structure results in a circulating alternating magnetic flux which alternately flows upward in the center leg 104 and downward in the outer legs 110 and 112 and then downward in the center leg and upward in the outer legs.

Two shading pole windings 100 and 102 are wound upon shading poles formed in the face of the center leg 104 of pole piece 96 while shading pole windings 106 and 108 are wound upon shading poles formed in the face of outer legs 110 and 112, respectively. Alternating voltage derived from the alternating flux will be induced in each of shading windings 106, 100, 102 and 108 which are connected in series in that order. Shading windings 106 and 100 have winding direction and series interconnection, in view of the difference of flux polarity in their respective shading poles, such that their induced voltages are additive. Similarly shading windings 102 and 108 are so wound and series interconnected that their induced voltages add together and are in phase with the voltages of shading windings 106 and 100.

In the conductor intermediate shading windings 100 and 102 is a junction 114. Connected in circuit between this junction and the upper end of shading winding 108 is the series combination of filter choke 116, conductor 118, half wave rectifier element 120 and conductor 122. Connected in circuit between junction 114 and the upper end of shading winding 106 is the series combination of filter choke 116, conductor 118, half wave rectifier element 124 and conductor 126.

The connection of rectifier elements 120 and 124 is such as to permit current, caused by the voltage induced in shading windings 106 and 100, to flow in those coils during one-half cycle of such voltage and to permit flow of current resultant of the voltage induced in shading windings 102 and 108 during the opposite one-half cycle. The flow of circulating currents between shading windings 106 and 100 and shading windings 102 and 108 is prevented because rectifier elements 120 and 124, through which such current would necessarily flow, have connection in direction of opposite conductivity. Thus the shading windings 100 and 102 act alternately to maintain shading flux in the pole faces of center leg 104. While this flux may pulsate in the portion of center leg 104 between its shading poles, it circulates in but one direction through the shading poles of center leg 104. The number of turns and the amount of magnetic flux enclosed is the same in the case of each shading winding or is otherwise proportioned so that the shading winding current, and thus the pull exerted, is substantially balanced. Because of the filter action of filter choke 116, the pull is substantially constant as well.

Unidirectional shading flux is alternately developed in the shading pole faces of legs 110 and 112 by shading windings 106 and 108 respectively so that the flow of flux through the outer legs is maintained. However, the latter shading windings may be eliminated and would be eliminated where the pole piece comprises a single pole as in the magnet of Fig. 4.

The shading pole circuit of Fig. 3 could be used with such a single pole magnet or the modified shading pole circuit of Fig. 4 might be used. In the circuit of Fig. 4, a shading pole winding 128, a shading pole winding 130, a half wave rectifying element 132, a filter choke 134 and a half wave rectifying element 136 are connected in a series loop. A shorting conductor 138 is connected from the conductor intermediate shading windings 128 and 130 to a center tap on filter choke 134.

Induced current is permitted to flow in alternate half cycles first in shading winding 128 and then in shading winding 130 by the action of rectifier elements 136 and 132, respectively, to produce a continuous unidirectional shading flux. Flow of circulating current between shading windings 128 and 130 is prevented since each is wound such that its induced voltage is equal and opposite that of the other. Thus wound, the shading windings produce equal shading flux which in turn results in balanced, constant shading pull.

What we claim as new and desire to secure by Letters Patent is:

1. In an alternating current electromagnet, in combination, a magnetic structure comprising a pair of relatively movable elements, an alternating current energizing winding on one of the elements, a plurality of shading pole windings on at least one said pair of relatively movable elements, means including rectification means and a winding inductively related to said alternating current winding associated with said rectification means to supply unidirectional power to said shading pole windings, said shading pole windings being so wound and so disposed and so connected to said means that alternating voltages induced therein are effectively canceled.

2. The combination defined in claim 1 in which said means further comprises an electric filter element whereby the unidirectional power supplied to said shading pole windings is substantially constant.

3. In an alternating current electromagnet, in combination, a magnetic structure, a main alternating current magnetizing winding on said structure, a plurality of shading pole coils on said structure, rectifying means and a secondary winding inductively related to said alternating current winding connected to said rectifying means to supply unidirectional current to said shading pole windings, said shading pole windings being so connected, oriented and arranged that individual alternating voltages induced therein are effectively canceled.

4. In combination, an electromagnet having three spaced apart poles, an alternating current magnetizing winding disposed on the center pole, a secondary winding on the center pole inductively related to the magnetizing winding, a plurality of shading pole windings individualized to the poles of said electromagnet, full wave rectification means interconnecting the shading pole windings and the secondary windings for unidirectional current energization of the shading pole windings, said shading pole windings being connected in series circuit and being so wound and disposed on their respective poles of the electromagnet that alternating voltages induced in the individual shading pole coils are effectively canceled.

5. The combination defined in claim 4 in which said rectifier means further comprises an electric filter element whereby the unidirectional power supplied to said shading pole windings is rendered substantially constant.

6. In combination, a magnetic structure comprising a single magnetic pole and an armature and having a pair of shading pole sections formed therein, an alternating current magnetizing winding on the magnetic pole, a shading winding disposed on each of said shading pole sections, full wave rectification means and an alternating current source therefor to supply unidirectional current to said shading windings, the dimensions of the shading pole sections encompassed by the shading windings and the number of turns and winding direction and the interconnection of the shading windings resulting in induction therein of equal and oppositely phased alternating voltages and effective cancellation of said alternating voltages.

References Cited in the file of this patent

UNITED STATES PATENTS

| | | |
|---|---|---|
| 1,005,856 | Lindquist | Oct. 17, 1911 |
| 1,255,441 | Larson | Feb. 5, 1918 |
| 2,046,748 | Hudson | July 7, 1936 |
| 2,287,617 | Jones | June 23, 1942 |
| 2,360,954 | Logan | Oct. 24, 1944 |
| 2,613,254 | King | Oct. 7, 1952 |

FOREIGN PATENTS

| | | |
|---|---|---|
| 532,429 | Great Britain | Jan. 23, 1941 |